(12) United States Patent
Xu

(10) Patent No.: US 12,463,838 B2
(45) Date of Patent: Nov. 4, 2025

(54) BLOCKCHAIN METHOD AND SYSTEM, ELECTRONIC DEVICE, AND COMPUTER-READABLE STORAGE MEDIUM

(71) Applicant: Hao Xu, Anhui (CN)

(72) Inventor: Hao Xu, Anhui (CN)

( * ) Notice: Subject to any disclaimer, the term of this patent is extended or adjusted under 35 U.S.C. 154(b) by 549 days.

(21) Appl. No.: 17/907,768

(22) PCT Filed: Feb. 9, 2021

(86) PCT No.: PCT/CN2021/076184
§ 371 (c)(1),
(2) Date: Mar. 2, 2023

(87) PCT Pub. No.: WO2021/175110
PCT Pub. Date: Sep. 10, 2021

(65) Prior Publication Data
US 2024/0267238 A1 Aug. 8, 2024

(30) Foreign Application Priority Data
Mar. 4, 2020 (CN) .......................... 202010143573.5

(51) Int. Cl.
*H04L 9/00* (2022.01)
*H04L 9/32* (2006.01)

(52) U.S. Cl.
CPC .............. *H04L 9/50* (2022.05); *H04L 9/3213* (2013.01)

(58) Field of Classification Search
CPC ......... H04L 9/50; H04L 9/3213; Y02D 10/00; G06Q 20/02; G06Q 20/065; G06Q 20/223;
(Continued)

(56) References Cited

U.S. PATENT DOCUMENTS 10,684,753 B2 * 6/2020 Collins ................. G06F 16/532
11,954,120 B2 * 4/2024 Xu ........................... G06F 16/27
(Continued)

FOREIGN PATENT DOCUMENTS

CN 108805737 A 11/2018
CN 108846659 A 11/2018
(Continued)

OTHER PUBLICATIONS

F. Victor and S. Zickau, "Geofences on the Blockchain: Enabling Decentralized Location-Based Services," 2018 IEEE International Conference on Data Mining Workshops (ICDMW), Singapore, 2018, pp. 97-104 (Year: 2018).*
(Continued)

*Primary Examiner* — Michael R Vaughan

(57) ABSTRACT

The present invention relates to a blockchain method relating to geometric objects, a polygon storage method, an electronic device and a computer-readable storage medium. The blockchain token includes geometric data, and the geometric tokens are circulated through transfer, split, and merge. When geometric objects are of polygons representing the lands specified by the geographic location information, it is a suitable as blockchain for recording the transfer of land rights and interests. Except for the token representing the initial geometric objects, if the blockchain system limits all geometric objects in the blockchain to those generated by other tokens through transfers, splits or mergers, each polygon in an unspent token in the blockchain is unique and exclusive. If the initial polygon of the blockchain is one that represents the entire surface of the earth, the blockchain system can be used to record land circulation of the entire world.

17 Claims, 7 Drawing Sheets

(58) Field of Classification Search
CPC ........... G06Q 20/3678; G06Q 20/3827; G06Q 20/3829; G06Q 20/389; G06Q 20/401; G06Q 20/4016; G06Q 20/382; G06F 16/9024; G06F 16/27
See application file for complete search history.

(56) References Cited

U.S. PATENT DOCUMENTS

| | | | |
|---|---|---|---|
| 2018/0356236 A1* | 12/2018 | Lawrenson | H04L 9/3247 |
| 2020/0014529 A1* | 1/2020 | Kanza | G07F 9/001 |
| 2020/0051166 A1 | 2/2020 | Loh et al. | |
| 2020/0162256 A1* | 5/2020 | Pourtabatabaie | H04L 9/0872 |
| 2022/0173893 A1* | 6/2022 | Basu | H04L 9/3247 |
| 2022/0385469 A1* | 12/2022 | Pourtabatabaie | H04L 9/3218 |
| 2025/0053628 A1* | 2/2025 | Tali | H04L 9/3231 |
| 2025/0125964 A1* | 4/2025 | Pourtabatabaie | H04L 9/0872 |

FOREIGN PATENT DOCUMENTS

| | | |
|---|---|---|
| CN | 109410060 A | 3/2019 |
| CN | 109947889 A | 6/2019 |
| CN | 110838063 A | 2/2020 |
| CN | 111367999 A | 7/2020 |

OTHER PUBLICATIONS

International search report of PCT/CN2021/076184.

* cited by examiner (a)

(b)

BLOCKCHAIN METHOD AND SYSTEM, ELECTRONIC DEVICE, AND COMPUTER-READABLE STORAGE MEDIUM

CROSS REFERENCE TO RELATED APPLICATION

This patent application claims the benefit and priority of Chinese Patent Application No. 202010143573.5, filed on Mar. 4, 2020, the disclosure of which is incorporated by reference herein in its entirety as part of the present application.

TECHNICAL FIELD

The present invention is related to the fields of blockchain and computer graphics technologies. Specifically, the present invention is related to a blockchain system and method involving geometric tokens, a method for storing polygon data, electronic device and computer-readable storage medium.

BACKGROUND

A blockchain is a distributed ledger system that includes a distributed network of nodes, each running a ledger program according to the same blockchain protocol. The ledger consists of a chained data structure of blocks. Blocks contain transactional data. Each new block is added following the tail of the current chained data structure, and each transaction is guaranteed to be tamper-proof, undeniable, and unforgeable through cryptographic algorithms. New block is broadcasted in the network immediately after it is generated, and only the new block generated by the node that completes the proof-of-work first will be accepted by other nodes each time. Token is a cryptographically certified value that can be circulated in the blockchain. Tokens include two components which are value and ownership. Traditionally, the value component of the token takes a form of a number, which we call the numerical token. For example, a Bitcoin token is an output of a transaction, its value component is the quantity of Bitcoins in the output, and its ownership component is the lock script in the output. Conventionally, transaction information in the blockchain is transfer record of numerical tokens. This kind record is suitable for recording transactions that can be expressed by numbers, such as the transfer of funds. However, it cannot record transactions that need to be expressed in geometric data. For example, land could not be measured with a single number but could be represented by polygons which is beyond the capability of conventional blockchain technology since it could not record the circulation of polygons.

Prio-art polygon data structure is not suitable for use on the blockchain as a token. Conventionally, polygons are represented by a loop-edge-vertex structure in computers, that is, a polygon is described as a set of loops, and loop a set of connected edges, which form a closed shape, and edge a line segment which connects two vertices. In a system containing a large number of polygons, there are often a large number of common edges and vertices in the polygons, so directly using the loop-edge-vertex structure to represent each polygon will result in a waste of storage space. Prio-art techniques save storage space by indexing edges and vertices. What is stored in the loops is not edge data, but the index of the edge data. What is stored in edges is not the coordinates of the vertex, but the index of the vertex. However, for complex polygons, as in the case of geographic information systems, there are a large number of common edges between two polygons, and simply indexing the edges cannot reduce the number of edges in the loops, and thus cannot effectively reduce storage space requirements. What's more, because records on the blockchain are immutable, even a small adjustment to an edge requires redefining the entire polygon, which requires constructing a new transaction, thus such storage method is not flexible for the need of blockchain.

SUMMARY

The present invention provides a block chain method and a polygon storage method, aimed to solve the technical problems described above.

The present invention is implemented as a blockchain method including the following steps:

S1. Receiving transaction or block, and the block is formed by packing transactions;

S2. Verify whether the received transaction or the transaction in the block are legal;

S3. If the received block is legal, appending the block after the tail of local blockchain data; if the received transaction is legal, keep the transaction, and periodically pack the received legal transactions into a block, appending the packed block after tail of the local blockchain data and broadcasting it to other nodes in the blockchain network;

The transaction includes tokens, and the tokens include geometric data.

Further, legal transactions must meet all the following three conditions:

Condition 1: The input to the transaction is a reference to a spendable token;

Condition 2: The transaction is cryptographically authorized;

Condition 3: The transaction is geometrically integral;

Spendable tokens are the unspent outputs (UTXOs) of other transactions in the blockchain, or tokens in a blockchain account.

Further, a transaction must satisfy both conditions 4 and 5 to be determined to be geometrically integral. Condition 4 and condition 5 are as follows:

Condition 4: There is no spatial overlap between the output geometric objects of the transaction;

Condition 5: The total space occupied by all input geometric objects is the same as the total space occupied by all output geometric objects;

The input geometric objects are the geometric objects in the spendable tokens referenced by the transaction inputs;

The output geometric objects are the geometric objects in the tokens of the outputs of the transaction.

Further, the geometric objects in the transactions are polygons, and each polygon is represented by a set of loops, and each loop is an ordered list of directional borders, and each directional border contains border and direction information. Border forest is a collection of border trees; border tree is a tree data structure. The border is an index or pointer referencing a node in the border forest. Each node of the border tree represents a zigzag line segment formed by the edges represented by all leaf nodes in the sub-tree of the border tree rooted at the node;

The method of verifying geometric integrity of a transaction is as follows:

Merge all input polygons and all output polygons respectively to form a group of merged input polygons and a group of merged output polygons;

If the group of merged input polygons and the group of merged output polygons consist of the same polygons, the transaction is geometrically integral;

The input polygons are the polygons in the spendable tokens referenced by the transaction inputs;

The output polygons are the polygons in the transaction output tokens;

If the number, order, and content of the lists of directional borders of the two loops are the same, or after several operations of op.1 or op.2, the number, order, and content of the lists of directional borders of the two loops are the same, then the two loops are equivalent:

Op.1: Circularly rotate the list of directional borders of one of the loops;

Op.2: Replace a directional border with sub-borders in one of the loops;

Two polygons are identical if the loops in the two polygons correspond one-to-one by equivalence.

Further, the method for merging polygons includes the following steps:

S11. Test whether polygon A and polygon B to be merged have common edges. If the test result is affirmative, obtain zigzag line segments composed of all common edges of polygon A and polygon B with endpoints as $(e_1, f_1), (e_2, f_2), \ldots, (e_w, f_w)$, wherein the line segments share no common endpoints;

S12. For each of the above line segments $(e_i, f_i)$, perform the following steps. After all are completed, all non-empty loops in A and B will form a merged polygon:

S121. If $e_j$ or $f_j$ is not an endpoint of the directional border that it is in, replace the directional border with sub-borders in the loop containing the directional border. Repeat it until $e_j$ and $f_j$ are both endpoints of a directed border in the loop;

S122. If the line segment $(e_j, f_j)$ appears in two different loops Q and R, merge the loops Q and R into a loop equivalent to W. The method to generate the loop W is as follows:

Rearrange loop Q and the loop R in their original circular orders, excluding the borders in the line segment $(e_j, f_j)$, to form two new directional border lists, such that the starting points of the first directional border and the ending points of the last directional border are endpoints of the line segment $(e_j, f_j)$ for both lists. Then concatenate the two lists of directional borders, the concatenated list of directional borders constitutes the new loop W;

S123. If the line segment $(e_j, f_j)$ appears twice in a loop W, split the loop W into two new loops named loop $W_1$ and loop $W_2$. The loops $W_1$ and $W_2$ are respectively composed of two groups of directional borders in the loop W that appear between the line segments $(e_j, f_j)$ according to the original circular order.

Further, the initial geometry is a polygon representing the surface of the earth.

The present invention is implemented as a blockchain method, characterized in that, during the circulation of tokens containing polygons in a blockchain system, users construct transactions, sends transactions to a node in the blockchain. The construction methods includes the splitting and merging of polygons, and the splitting method is as follows:

The polygons in transactions are represented by a group of loops. Each loop is an ordered list of directional borders. A directional border contains a border and direction information. The border forest is a collection of border trees. A border tree is a tree data structure. Border is an index or pointer referencing a node in the border forest, and the node of a border tree represents a zigzag line segment formed by all the edges represented by all the leaf nodes in the sub-tree rooted at the node;

Providing polygon P to be split and a set of dividing lines S, where P consists of n loops $L_1, L_2, \ldots, L_n$; S includes in dividing lines $S_1, S_2, \ldots, S_m$, each of which is a dividing line which consists of a list of directional borders, and for each dividing line S, perform the following steps:

S21. Test whether the two endpoints of the dividing line $S_i$ are both vertices in the polygon P. For the endpoint e of the dividing line $S_i$ that is not a vertex in the polygon P, find the node in the border forest for the edge of the polygon P where the endpoint e is on. If the starting and ending points of the node are a and b, respectively, add sub nodes under the node to the border forest to represent the edges (a, e) and (e, b);

S22. If the two endpoints of the dividing line $S_i$ are different, check whether the two endpoints of the dividing line $S_i$ are an endpoint of a directional border in polygon P, and for the endpoint r of the dividing line $S_i$ that is not an endpoint of any directional border in the polygon P. Replace the directional border containing r with sub-borders repeatedly until r is an endpoint of a directional border in the loop;

S23. If the starting point p and the ending point q of the dividing line $S_i$ are on loop u and loop v of polygon P respectively, merge loop u, loop v and the dividing line $S_i$ into a loop K in polygon P; loop K is equivalent to a loop formed by lists of directional borders concatenated in the order of 1), 2), 3) and 4): 1) All directional borders in loop u rearranged in the original circular order such that p is the starting point of the first directional border and the ending point of the last directional border; 2) All directional borders in the dividing line $S_i$ arranged in the original order; 3) All directional borders in loop v rearranged in the original circular order such that q is the starting point of the first directional border and the ending point of the last directional border; 4) All directional borders in the dividing line $S_i$ arranged in reverse order with their direction information reversed;

S24. If the starting point p and the ending point q of the dividing line $S_i$ are on the same loop L of polygon P, then split the polygon P into two polygons A and B, and return A and B as the result split polygons; the splitting method includes the following steps:

S241. Construct two loops $N_1$ and $N_2$, where loop $N_1$ is equivalent to the loop formed by concatenating the following lists of directional borders: all directional borders in the dividing line $S_i$ in their original order; directional borders of L in the original circular order starting at q and ending at p; the loop $N_2$ is equivalent to the loop formed by concatenating the following lists of directional borders: all directional borders in $S_i$ in reverse order with their direction information reversed; the directional borders of L in the original circular order starting at p ending at q;

S242. Polygon A consists of loop $N_1$ and all loops of polygon P that is in the interior side of loop $N_1$, polygon B consists of loop $N_2$ and all the loops of polygon P that is in the interior side loop $N_2$;

S25. If the starting point and ending point of the dividing line $S_i$ are not on any loop of the polygon P, and the starting point and ending point of $S_i$ are the same vertex, split polygon P into two polygons A and B, and return A and B as the result split polygon; the splitting method includes the following steps: polygon A consists of a loop X which is equivalent to the list of directional borders in $S_i$ arranged in counterclockwise orientation, and all loops in polygon P in interior side of loop X; polygon B consists of a loop which is equivalent to the list of directional borders in $S_i$ arranged in clockwise orientation, and all other loops in the polygon P;

The merging method is as follows:

Test whether polygon A and polygon B to be merged have common edges. If the test result is affirmative, obtain zigzag line segments composed of all common edges of polygon A and polygon B with endpoints as $(e_1, f_1)$, $(e_2, f_2)$, ..., $(e_w, f_w)$, wherein the line segments share no common endpoints;

S12. For each of the above zigzag line segments $(e_j, f_j)$, perform the following steps. After all are completed, all non-empty loops in A and B will form the merged polygon:

S121. If $e_j$ or $f_j$ is not the endpoint of the directional border that it is in, replace the directional border with sub-borders in the loop containing the directional border. Repeat it until $e_j$ and $f_j$ are both the endpoints of a directed border in the loop;

S122. If the line segment $(e_j, f_j)$ appears in two different loops Q and R, merge the loops Q and R into a loop equivalent to W. The method to generate the loop W is as follows:

Rearrange directional borders of loop Q and the loop R in their original circular order, excluding the borders in the line segment $(e_j, f_j)$, to form two new directional border lists, such that the starting points of the first directional border and the ending points of the last directional border are endpoints of the line segment $(e_j, f_j)$ for both lists. Then concatenate the two lists of directional borders, the concatenated list of directional borders constitutes a new loop W;

S123. If the line segment $(e_j, f_j)$ appears twice in a loop W, split the loop W into two new loops named as the loop $W_1$ and the loop $W_2$. The loops $W_1$ and $W_2$ are respectively composed of two groups of directional borders in the loop W that appear between the line segments $(e_j, f_3)$ according to the original circular order.

If the number, order, and content of the directional borders lists of the two loops are the same, or after several operations of op.1 or op.2, the number, order, and content of the directional borders lists of the two loops are the same, then the two loops are equivalent:

Op.1: Circularly rotate the list of directional borders of one of the loops;

Op.2: Replace a directional border with sub-borders in one of the loops;

The present invention is implemented as a blockchain system, characterized in that the system consists of several nodes and several terminals, and the nodes and the terminals are connected to the Internet and communicate with each other through the Internet;

The terminal constructs transaction according the method described above per user, and sends the transaction to the nodes in the blockchain system;

The node receives the transaction sent by the terminal or the block sent by other nodes, the block is packed with transactions. The node verifies whether the received transaction or the transactions in the block are legal, and if the received block is legal, the block is appended to the tail of local blockchain data. If the received transaction is legal, keep the transaction, periodically pack the received legal transaction into a block, append the packed block to the tail of the local blockchain data and broadcast it to other nodes in the blockchain network.

The present invention is implemented as an electronic device comprising storage medium, processor, and computer program stored in the storage medium and executable by the processor. The processor implements the methods above when executing the program.

The present invention is implemented as computer-readable storage medium on which a computer program is stored, and when the computer program is executed by a processor, the blockchain method described above is implemented.

The present invention is implemented as a storage method for polygon data, characterized in that: border forest is a collection of border trees; border tree is a tree data structure; border is an index referencing a node in the border forest, and a node of border tree represents the zigzag line segment formed by all the edges represented by all leaf nodes in the sub-tree rooted at the node.

If the set of contiguous edges in a polygon is the set of edges represented by all leaf nodes in a sub-tree rooted at a node in the border forest, the index of the node is stored in the polygon data to represent this segment of contiguous edges.

If the starting point and the ending point of a segment of contiguous edges in the polygon are the two endpoints of an edge represented by a leaf node of a border tree in the border forest, store the index of the leaf node in the polygon data to represent this segment of contiguous edges, and to the border tree a sub-tree rooted at the leaf node such that the set of all the edges represented by all the leaf nodes of the sub-tree is the set of all the contiguous edges of the segment;

For an edge in a polygon, if there is no leaf node in the border forest representing the edge, add a new border tree is to the border forest. The set of all the edges represented by all the leaf nodes in the border tree contains only the edge above. Store the index of the root node of the border tree in the polygon data to represent the edge;

Store the polygon data above in the storage medium.

Traditionally, the value component of a token in the blockchain takes the form of a number, which we call numerical token. For example, a Bitcoin token, setting aside owner and the encryption parts, the core content is the amount of Bitcoins. Traditionally, a transaction in the blockchain is the transfer record of numerical tokens. Such kind numerical tokens are suitable for recording transactions that can be expressed numerically, such as the transfer of funds, but cannot be used to record transactions of non-numerical value, such as land transfers. The present invention solves the problem of using the blockchain to process the circulation of spatial rights. For example, based on the principle of the invention, the land can be represented by a two-dimensional polygon to solve the problem of processing the land circulation using blockchain. Or we could use three-dimensional polyhedrons to represent the mining rights to solve the problem of using the blockchain to deal with the circulation of the mining rights, or use it to represent in-air space to solve the problem of flight channel management in aviation. Any spendable token containing geometry on a blockchain according to the present invention can be determined to be unique without further verification. It does not overlap with any other geometric object in any other spendable token. So it can be used for determining spatial rights of land, mining rights, navigation channels, sea area, etc. It may also be used in transportation, architecture, industrial design and other fields to solve the problem of conflicts in the design and placement of roads, buildings, objects, components, etc.

By adopting the data structure for polygon representation in the present invention, it is possible to avoid wasting storage space, avoid redefining the entire polygon for local adjustments, and improve processing efficiency. If there is a set of common edges between two polygons forming a long zigzag line, for example, a territorial border line between two countries. This territorial border line may appear in whole or in part in the maps of the country, province, city, and county. If the four level administrative areas are represented by polygons, traditionally each polygon needs to enumerate all edges of the territorial border lines. By adopting the method here, a polygon only needs to include an index of the territorial border lines in the border tree to describe a segment of territorial border line corresponding to the administrative area. Therefore, only a quarter of the storage space of the traditional method is required for the four administrative level maps to represent these territorial border lines. The more times a border is referenced by polygons, the more storage space is saved. Further, if part of the territorial border lines that was originally uncertain is determined due to surveying. so that an edge in the map needs to be changed into a zigzag line. According to the traditional polygon representation method, the entire polygon needs to be redefined. With the present invention, it only needs to add child nodes below the original nodes in the border tree thereby avoiding redefining the entire polygon for local adjustments. The method of the present invention can also process polygons more efficiently. For example, when two polygons are found to contain the same border, it can be judged that they have a common edge. When merging polygons, the border can be deleted directly without checking the edges contained in the border.

For blockchain containing polygon tokens, it is particularly necessary to avoid redefining the entire polygon for local adjustments. Because the blockchain data cannot be changed, if the polygon is represented in the traditional way, the polygon is completely fixed after the transaction is completed. For such territorial border demarcation situation mentioned above, all those who hold the relevant polygon tokens need to conduct a transaction to obtain new polygons. However, with the method of the present invention, when the user with modification authority adds sub-borders line below the original border in the tree data structure, it has the effect of changing all the relevant tokens.

DETAILED DESCRIPTION

The embodiments of the present invention are described in further detail below with reference to the attached figures. By describing these embodiments, we hope to help technicians in the field to shape a more complete, accurate and in-depth understanding of the invention and technical solutions of the present invention.

Figure 1:
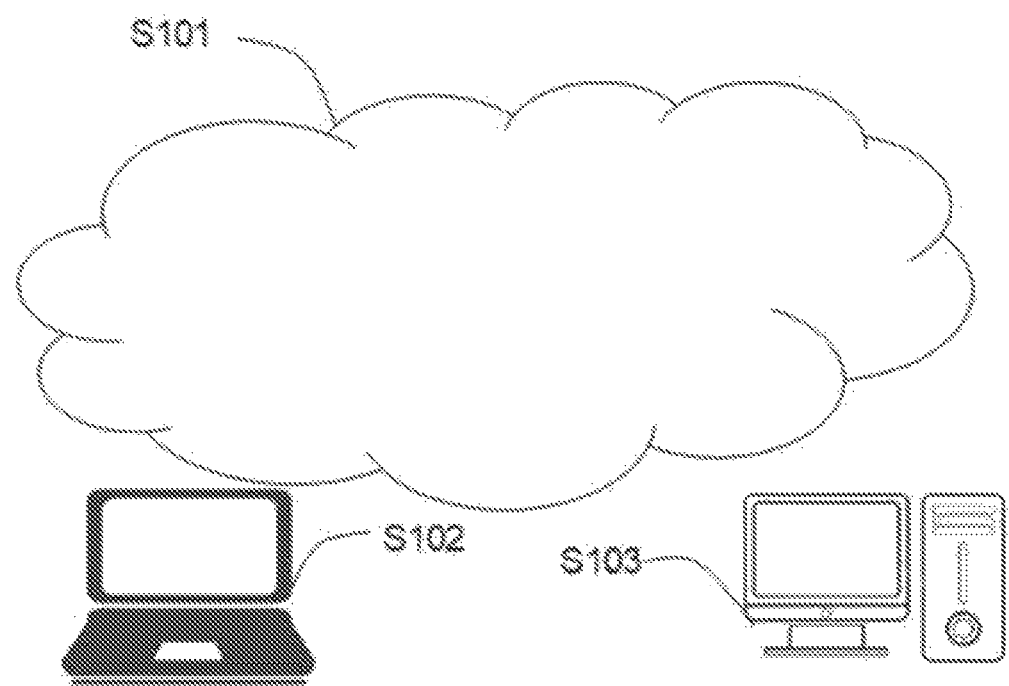
FIG. 1 is a high level block diagram that illustrates a blockchain system, according to an embodiment.

FIG. 1 is a typical blockchain system, which includes: terminals and nodes. Terminals communicate with the nodes in the blockchain network through the Internet. Terminals are usually electronic devices such as computers, mobile phones, pads, etc. Nodes are usually computers, servers or blockchain mining electronic equipments. Local blockchain data refers to the blockchain data stored on the corresponding node. Terminals are used to enter transaction data and send the transaction data to nodes in the blockchain network. Nodes receive transaction data sent by terminals or block data sent by other nodes, then generate and record the blockchain data. Blockchain transaction data include tokens, which contain value component and ownership component. The value component usually is a measurement of worth of the token, and the ownership component is the data that determines the ownership of the token. A transaction consists of a set of inputs and a set of outputs. Each output of a transaction is a token. In some embodiments each input of a transaction is a reference to an output of another transaction. In some other embodiments each input of a transaction is a token.

An embodiment of the present invention is a blockchain method, comprising the following steps:
S1. Receive transaction or block. The block is formed by packing transactions;
S2. Verify that the received transaction or the transactions in the block are legal. If any transaction in the block is illegal, the block will be rejected. If the received transaction is illegal, the transaction will be rejected. If the block is legal, append it after the tail of local blockchain data.
S3. Pack transactions received in a period of time into a block, append the block to the tail of the local blockchain data and broadcast it to other nodes in the blockchain network.

The transactions include tokens, and the tokens include geometric object data. Geometric object data is a part of the token as the value component of the token. The geometric object data in the token is either a data structure describing the geometric object, or an ID value or index value referencing a data structure describing the same, such as a hash value of the data structure. The geometric object can be a polyhedron or a polygon, or any other geometric object in mathematical sense.

In one embodiment of the present invention, verifying whether a transaction is legal mainly involves detecting whether a transaction satisfies the following three conditions:

Condition 1: Inputs of the transaction are spendable tokens in the blockchain;

Condition 2: The transaction is cryptographically authorized;

Condition 3: The transaction is geometrically integral;

If all the above three conditions are met, the transaction is determined to be legal.

Mainstream blockchain technologies use two types of book-keeping systems. One is the UTXO method, such as what is used by the Bitcoin. This method does not record the user's assets in a centralized record. Instead, users prove their ownership of assets by cryptographically unlocking a transaction output and spend the transaction output at the same time. The other method is an account based book-keeping method, such as what is used by the Ethereum, which is similar to the traditional accounting method. In this method, in addition to transaction records, the blockchain also stores the mapping relationship from Ethereum addresses to assets. Each mapping relationship constitutes an account. The Ethereum address is the hash value of a public key, and the asset transferring party in the transaction proves ownership of the Ethereum address cryptographically, hence ownership of the assets under the mapping. Once a legal transaction is accepted by the blockchain, the node updates the mapping by deducting the transferred assets from the sender's account and adding it to the receiver's account.

The present invention may be implemented using either accounting methods. If the UTXO accounting method is used in an embodiment, a spendable token is an unspent output of another transaction.

If the account based book-keeping method is used, wherein an account is a mapping relationship from a blockchain address to a collection of data, including that describing some geometric objects, a spendable token is the data that describes a geometric object in the collection. In a transaction, senders of the geometric objects prove their ownership cryptographically. Once the transaction is accepted by the blockchain, the node deletes data of the geometric object from the collection of the senders, and inserts data of the geometric objects to the collections of the receivers.

It is easier to implement the present invention using the UTXO accounting method than using account based method. However, according to the description of an embodiment based on UTXO method, technicians in the field can construct an embodiment of the present invention using account based method without making any creative effort, which is also protected under the present invention.

In an embodiment of the present invention, steps for verification of geometric integrity are as follows:

Test the transaction, if both conditions 4 and 5 are satisfied, determine the transaction to be geometrically integral:

Condition 4: There is no spatial overlap among the output geometric objects of the transaction;

Condition 5: The total space occupied by all input geometric objects is the same as the total space occupied by all output geometries;

An input geometric object is the geometric object in a spendable token referenced by a transaction input;

An output geometric object is the geometric object in an output token of the transaction.

In another embodiment of the present invention, the geometric objects in the blockchain are polygons. For verification of geometric integrity involving only polygons, it is not necessary to apply conditions 4 and 5, the following steps may be taken instead:

Test whether the data in the transaction outputs describe legal polygons. If the test result is negative, it is determined that the transaction is not geometrically integral, hence the transaction is not legal.

Data that describe a legal polygon have the following three characteristics: 1) There is only one loop in counter-clockwise direction, and the loop is called the outer loop, and the other loops of the polygon are inner loops; 2) All inner loops fall inside the outer loop and none of the inner loops fall inside another inner loop; 3) All the loops are neither intersecting nor self-intersecting.

Merge all input polygons and all output polygons respectively to form a group of merged input polygons and a group merged output polygons. Input polygons are the polygons in the spendable tokens referenced by inputs of the transaction, and output polygons are polygons in the transaction output tokens.

If the group of merged input polygons and the group of merged output polygons consist of the same polygons, the transaction is determined to be geometrically integral.

One embodiment of the present invention is a method to describe a polygon in a blockchain.

Nodes and terminals in a blockchain network need to process polygon data. Method for polygon description is needed when nodes validate transactions and when terminals construct transactions. Local device refers to a blockchain node or terminal executing the methods.

First, the local device has a storage medium to store a border forest; a border forest is a collection of border trees; a border tree is a tree data structure wherein a tree-like hierarchy exists among borders. Geometrically, a border is either an edge of a polygon, or formed by some contiguous edges. Edges in a border might belong to one polygon, or might belong to different polygons. In data structures, border represents a node in a border tree. Nodes store the actual geometric data of border and structural information about the tree. Border generally takes the form of a reference or pointer to a node, usually as hash value of node data. Geometrically, a border represents a zigzag line of contiguous edges connecting two vertices (they are not necessarily neighboring, and may belong to different loops or polygons). The two vertices are called starting point and ending point, and collectively endpoints. When a border has no sub-border, it represents the line segment connecting the two vertices, i.e. an edge in a polygon. When it has sub-borders, it represents the zigzag line formed by all the edges represented by all the leaf nodes in its sub-tree. Borders form a tree structure according to their belonging relationship (also called parent-children relationship). In an embodiment of the present invention, the node data include the indices of the starting and ending points of the border and the indices of their parent nodes (nil if it has no parent). We use a triple (a, b, f) to denote these information where a is index of the starting point, b is index of the ending point, and f is the index of the parent node. A node index is a value that uniquely represents a node, and the hash value of its content can be used as the index. The index of a vertex is a value that uniquely represents a vertex, and the hash value of the coordinates of the vertex can be used as the index of the vertex.

Technicians in the field should be able to construct the tree structure in other ways without creative work. As long as the work reflects a hierarchy of borders, it is protected under the present invention. For example, a border tree may be constructed such that: only the index of one vertex is stored in the leaf node. For a border with N sub-borders, the corresponding node will have N+1 child nodes. These child nodes are arranged in certain order. If these child nodes are leaf nodes, the child node represents the edge formed by the vertex in this node and the vertex in the next leaf node. This storage method can reduce the requirement for storage space, but for any non-leaf node in the tree, the sub-tree of the node must be traversed to know the start and end points of its border, so it will take more processing time.

A polygon comprises of loops, which are closed geometric shapes comprising of contiguous borders. Because there is a tree hierarchical relationship between borders, if the details of a polygon change, it is not necessary to change definition of the top-level border, just redefine the bottom-level border where the detail changes occur will do. Besides, border data can be shared among different polygons, which can reduce the demand for data storage space on the one hand, and ensure topological consistency across polygons on the other hand.

According to the convention of computer graphics, a loop has an orientation, which is indicated by the sequential order of the borders in the loop. The orientation of a loop is the orientation such that when a person walks on the loop according the sequential order of the borders, the interior of the polygon is on the left side of the person. Interior of a polygon is a simple connection region, thus each polygon has one and only one counterclockwise loop, but can have no or multiple clockwise loops. Obviously, based on the principles of the present invention, technicians in the same field can construct another embodiment of the present invention, wherein the right side of the walker is defined as the inner side, and the clockwise orientation is the orientation of the outer loop, or a polygon that allows multiple connected regions, which are all protected under the present invention.

Adjacent polygons have common borders, however, when walking according to the orientation of their respective loops, walkers travel in opposite directions on these common borders. Thus, storages space could be more effectively utilized if information of direction of borders is supplemented in loops.

In an embodiment of the present invention, polygons are stored in the form of loops. Each loop is an ordered list of directional border, which is a pair of border and direction information (d, 1). The direction information f indicates whether the direction of the border d is consistent with the orientation of the loop.

Based on the principles of the present invention, a person skilled in computer graphics can construct another method for representation of polygons without creative work. One may use a method where the loop is not represented by a set of borders with direction flags, but a set of vertices. In this way of representation, the meaning of a vertex in the loop is not simply a vertex, but represents a border with this vertex and the next vertex in the loop as the endpoints in cyclic order, and the direction of the border is the direction from this vertex to the next vertex. Therefore, interpretation of the concept of directional border in the present invention shall not be limited to a pair of border and direction information. Any data containing border and direction information (including that deducible from loop data structure) should be regarded as a form of directional border. The phrase "directional border is data containing border and direction information" should be construed as that directional border are the data from which border and direction information can be deduced. Using a set of vertex indices or other means instead of a set of border and direction flag pairs to represent a loop, while it appears different than the present invention, it is still protected under the present invention if the border and direction information can be determined according to the data structure.

In an embodiment of the present invention, if the direction from the starting point to the ending point of the border d is consistent with orientation of the loop, the direction information f is true in the respective directional border, otherwise the direction information f is false. Therefore, if f is true, the starting and ending points of the directional border are the starting and ending points of the border d respectively. If f is false, the starting point of the directional border is the ending point of the border d, and the ending point of the directional border is the starting point of the border d. The list of directional borders of a loop is an ordered list, and the order of the directional borders in the list is consistent with the orientation when walking along the loop. If the directional borders in the loop are rearranged in circularly, it remains the same loop geometrically, and we call that the two lists of directional borders circularly equivalent.

A border is equivalent to the line segment of the zigzag lines composed of all its sub-borders. For a directional border in a loop, the resulting loop is also equivalent to the original loop if replacement is made according to the following rules:

For a directional border A in the loop, if starting point and ending point of its border are P, Q respectively and its direction information is F, and border PQ has sub-borders $PW_1, W_1W_2, \ldots, W_{n-1}W_n, W_nQ$, replacing the directional border with a list of directional borders in the loop as follows: if F is true, a ordered list of directional borders $PW_1, W_1W_2, \ldots, W_{n-1}W_n, W_nQ$ with their direction information set to true; if F is false, a ordered list of directional borders $W_nQ, W_{n-1}W_n, \ldots, W_1W_2, PW_1$ with their direction information set to false.

An operation according to the rule above is called replacing directional border with sub-borders.

Two loops are equivalent if they can be made circularly equivalent by repeatedly replacing directional border with sub-borders. The equivalence of loops can also be expressed more formally as:

After several operations of Op.1 or Op.2 (including no operation), if the quantity, order, and content of the directional borders of the two loops are the same, the two loops are equivalent:
Op.1: Rotate the list of directional borders of one of the loops circularly;
Op.2: Replace a directional border with sub-borders in one of the loops.

Two polygons are identical if they actually occupy the same space, no matter what data structure are used to described them. Therefore, two polygons are identical if their loops correspond one-to-one by equivalence.

Figure 2:
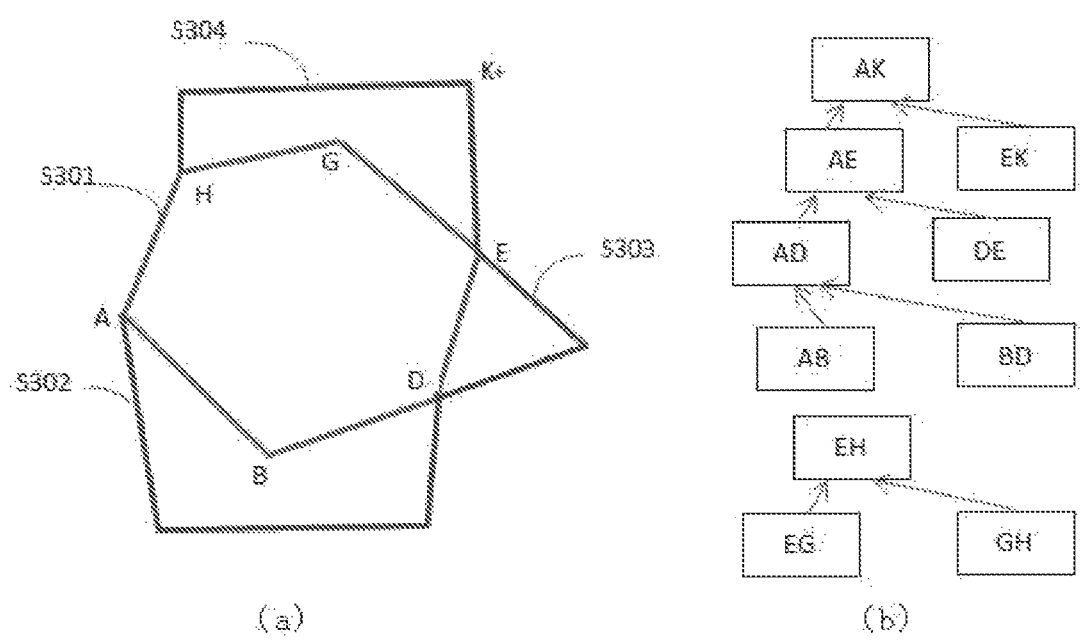
FIG. 2 illustrates a structure for storing data of geometric objects according to an embodiment, wherein (a) are geometric objects, and (b) parts of border forest for some borders of the geometric objects in FIG. (a)

FIG. 2 (a) is an example with four polygons (S301, S302, S303, S304). FIG. 2(b) is an example of some border trees according to FIG. 2(a). The arrows in FIG. 2(b) illustrate the parent-child relationship among borders. A box illustrates a border. Letters in a box are starting and ending point of the respective border. Polygon S301 has one loop. It contains three directional borders AE, EH, HA, wherein border AE is a sub-border of border AK and is also the parent border of borders AD, DE. Border AD is the parent border of borders AB, BD. When the direction of a border is not consistent with orientation of the loop, direction information for the directional border in the loop shall be false. In the figures, we illustrate it by adding a "—" sign before the border. Thus, polygon S302 has only one loop, and in the loop there is a directional border "-AD". Polygon S303 has only one loop, and in the loop there is a directional border "-DE". Polygon S304 has only one loop, and in the loop there is a directional border "-EH". In these four polygons, data of borders AD, DE, EH are shared between two polygons.

One embodiment of the present invention is a method for merging polygons. Polygons in the blockchain are represented according to the method described above. Merging polygon A and polygon B contained in input of a blockchain transaction comprises of the following steps:

S11. Find the zigzag line segments $O_1, O_2, \ldots O_n$ that consist of and only of all common edges between A and B wherein no two segments having a common endpoint. If there is no such segment, polygon A and polygon B cannot be merged.

S12. Add all loops of polygons A and B to a set of loops named L.

S13. For each segment $O_j$, where $(e_j, f_j)$ are the endpoints of the segment $O_j$, perform the following steps:

S131. If either $e_j$ or $f_j$ is not an endpoint of the directional border that it is in, replace the directional border with sub-borders in the loop containing the directional border. Repeat this step until $e_j$ and $f_j$ are both endpoints of some directional borders in the loop;

S132. If $O_j$ appears in two loops Q and R of L, merge them into one loop in L. The method of merging comprises of replacing Q and R in L with a new loop which is obtained by removing the borders in $O_j$ from the directional border lists of Q and R, rearranging their directional borders in their original circular order so that the starting points of their first directional borders and the ending points of their last directional borders are the endpoints of $O_j$, then concatenate the two lists of directional borders to form a new loop.

S133. If $O_j$ appears twice in a loop W of L, split W into two new loops in L. The two new loops comprise of direction borders listed in the following orders respectively: starting from $O_j$, traverse W in circular order, add the directional borders visited after the first occurrence of O and before its second occurrence to one loop; add the directional borders visited after the second occurrence of $O_j$ and before its next occurrence to another loop.

S134. After all common borders are processed according to the steps above, the non-empty loops remaining in L constitute the merged polygon, which is in or added to output of the transaction.

The above method of merging polygons is not the only polygon merging method, one can rotate the directional borders in the loop circularly, or replace a parent directional border with sub-borders, or merge some directional borders in the loop into the parent directional border, resulting in a loop different from but equivalent to that produced by the above method. Any merge method that generates polygons equivalent to those generated by the method above are protected under the present invention.

Figure 3:
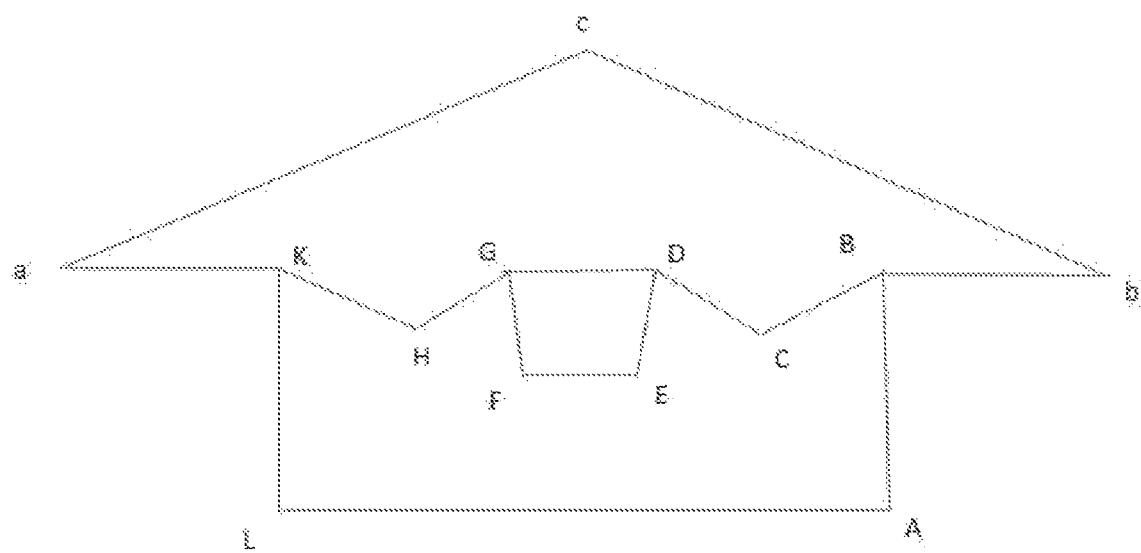
FIG. 3 illustrates examples of polygons to be merged according to an embodiment.
Figure 4:
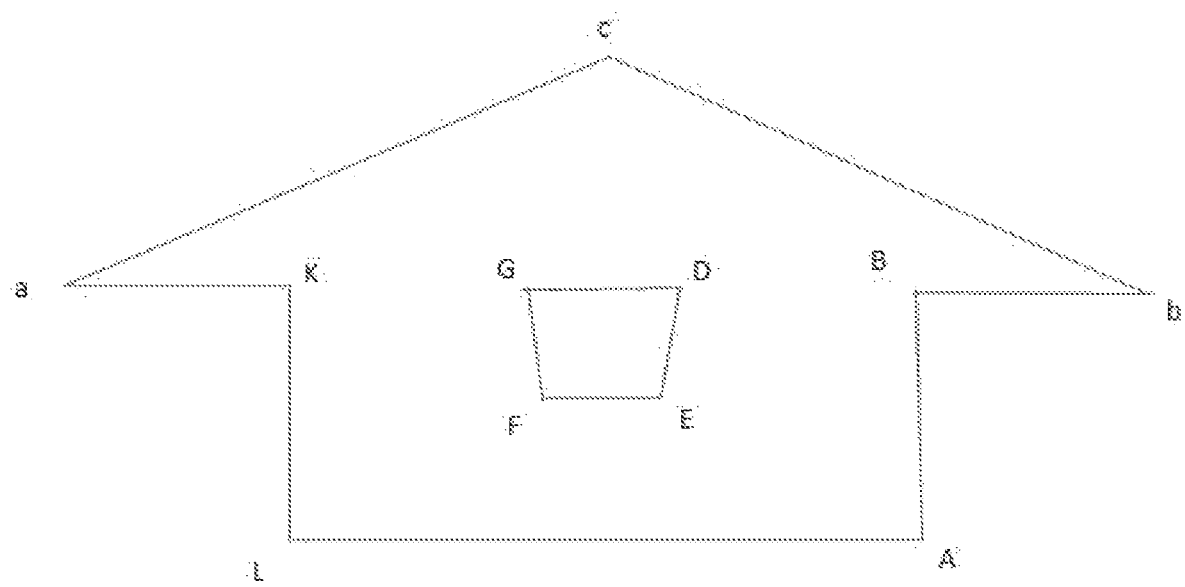
FIG. 4 illustrates first example of merging polygons according to an embodiment.

FIGS. 3 and 4 are examples of merging polygons according to the method described above. P (lower part in FIG. 3) and Q (upper part in FIG. 3) are polygons in FIG. 3 to be merged. They have two common contiguous line segments, BCD and GHK. Since both P and Q have only one loop, we also refer the respective loops by P and Q. The directional borders in loop P are: AF, FH, HL, LA. The directional borders in loop Q are: aK, -HK, -GH, GD, -CD, -BC, Bb, be, ca. The sub-borders of AF are: AB, BC, CD, DE, EF. The sub-borders of FH are: FG, GH. The sub-borders of HL are: HK, KL.

1) First, process the contiguous line segment BCD. Because B and D are not the endpoints of borders in P and Q, according to step S131, directional border AF in P is to be replaced with sub-borders, and the resulting loop P is: AB, BC, CD, DE, EF, FG, GH, HK, KL, LA.

Because the contiguous line segment BCD appears in both the loops P and Q, they are combined into one loop according to step S132, the method is: delete the BCD from loop Q and rearrange the directional borders with D as the starting point, namely: DE, EF, FG, GH, HK, KL, LA, AB. Deleting BCD from loop P, rearrange the directed boundary lines with B as the starting point, namely: Bb, be, ca, aK, -HK, -GH, GD. Concatenate the two list and the result is: DE, EF, FG, GH, HK, KL, LA, AB, Bb, be, ca, aK, -HK, -GH, GD.

2) Then process the contiguous line segment GHK. Because GHK appears twice in the above merged loop, the loop is split into two loops according to step S133, one loop comprises of the directional borders in the merged loop from GD to FG in circular order, namely: GD, DE, EF, FG. The other loop comprises of the directional borders in the merged loop from KL to aK in circular order, namely: KL, LA, AB, Bb, be, ca, aK. The merged polygon consists of these two loops, as shown in FIG. 4.

Figure 5:
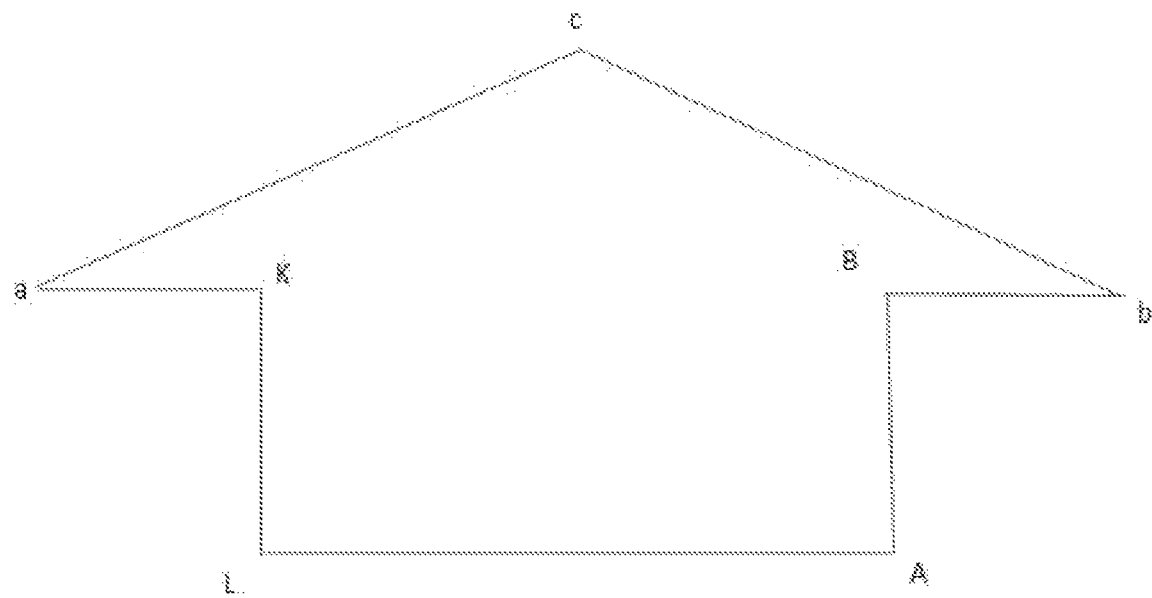
FIG. 5 illustrates second example of merging polygons according to an embodiment.

FIGS. 4 and 5 are another example of merging polygons. Merge the merged polygon above with another single-loop polygon S. The directional borders of S are -FG, -EF, -DE, -GD. That is, S is a loop with the same borders as the first loop in the above merged polygon, but in the opposite orientation. The common contiguous line segments of these two polygons are GD, DE, EF, and FG. According to S132, loops GD, DE, EF, FG and -FG, -EF, -DE, -GD need to be merged. The merging method is to first remove these boundary lines from loop S and loops GD, DE, EF, FG. Since both loops are empty after deletion, no new loops need to be added. The result of the merging is a polygon with a single loop, which is: KL, LA, AB, Bb, be, ca, aK, as shown in FIG. 5.

Another embodiment of the present invention is to construct transactions are by blockchain terminals. The simplest transactions are that combines polygons into one polygon, or that splits a polygon into several. In this embodiment, the input of a transaction comprises of a spendable token. The polygon P in the spendable token to be split is described according to the method above that P comprises of n loops $L_1, L_2, \ldots, L_n$. There is a group of dividing lines S. S comprises of m contiguous line segments (called dividing lines, each dividing line comprises of one or more directional borders listed in proper order) $S_1, S_2, \ldots, S_m$. All the dividing lines are inside polygon P. The method for splitting the polygon comprises of the steps below:

S21 For each dividing line $S_i$, test whether its two endpoints are both vertices in P. For an endpoint e that is not a vertex in P, find the edge where e is on and the corresponding border (a, b, J) of the edge. If its index is g, add nodes (a, e, g) and (e, b, g) to the border forest, which makes them child nodes of g.

S22 Test whether the two endpoints of S are both an endpoint of a directional border in P. For the endpoint e of $S_i$ that is not an endpoint of any directional border in P, repeatedly replace the directional border that e is in with sub-borders until e is an endpoint of a directional border in P;

S23 If the starting point p and the ending point q of $S_i$ are on different loops u and v in P respectively, merge the two loops and $S_i$ into one loop in P. Keep other loops in P unchanged. The list of directional borders of the merged loop is circularly equivalent to a list that is concatenated in the following order: all directional borders in u rearranged in the original circular order, so that p is the starting point of the first directional border and the ending point of the last directional border; all directional borders in $S_i$ arranged in its original order; all directional borders in v rearranged according to the original circular order, so that q is the starting point of the first directional border and the ending point of the last directional border; all directional borders in $S_i$ arranged in reverse order with their direction information reversed;

S24 If the starting point p and the ending point q of $S_i$ are on the same loop L of P, split P into two polygons A and B, and return A and B as the splitting result polygons. A and B are in or added to output of the transaction. The splitting method includes the following steps:

S241 Construct two loops $N_1$ and $N_2$; wherein the loop $N_1$ is a list of directional borders that is circularly equivalent to a list that is concatenation of lists in the following order: all directional borders in $S_i$ arranged in its original order; sub-list of directional borders in L in the original circular order starting from the directional border having q as starting point and until the directional border having p as ending point. The loop $N_2$ is a list of directional borders that is circularly equivalent to a list that is concatenation of lists in the following order: all directional borders in $S_i$ arranged in reverse order with their direction information reversed; sub-list of directional borders in L in the original circular order starting from the directional border having p as starting point and until the directional border having q as ending point;

S242 Polygon A comprises of loops $N_1$ and those loops of P that are in the interior side of $N_1$, polygon B consists of loops $N_2$ and those loops of P that are in the interior side of $N_2$;

S25 If the starting point and ending point of the dividing line $S_i$ are not on any loop of the polygon P, and the start point and end point of $S_i$ are the same vertex, then split the polygon P into two polygons A and B, and return A and B as the split result polygons. The splitting method comprises the following steps: polygon A comprises of a loop X which is a circularly equivalent to the list of directional borders in $S_i$ in counterclockwise orientation and the loops of P that are inside the loop X. Polygon B consists of a loop circularly equivalent to the list of directional borders in $S_i$ in clockwise orientation and all other loops in polygon P.

The method above for splitting polygons is not the only method of polygon splitting, one could circularly rotate the directional borders in a loop, or replace a directional border in a loop with sub-borders, or merge sub-borders in a loop into the parent directional border, resulting in loops different from but equivalent to the loops produced by the above method, any splitting method that produces polygons equivalent to those produced by the above method are protected by the present invention.

In another embodiment of the present invention, the method for merging polygons when constructing a transaction is the same as the method for merging polygons when verifying a transaction, that is, the method described in S11-S34.

Figure 6:
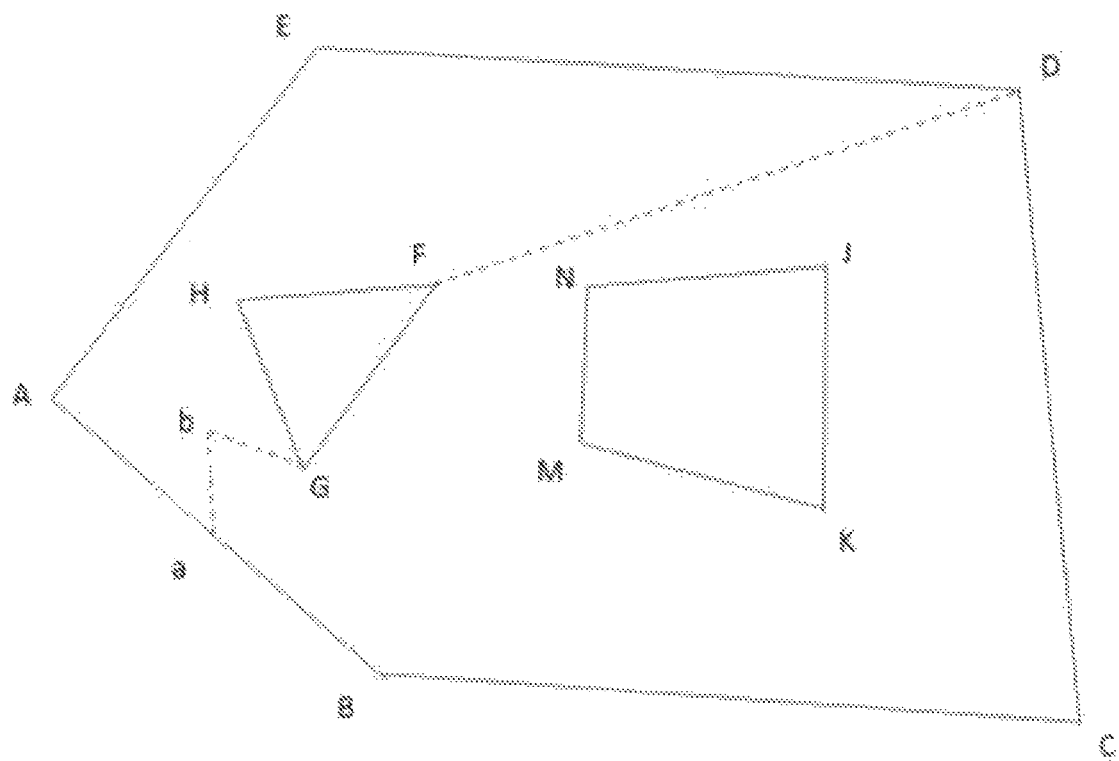
FIG. 6 illustrates examples of splitting a polygon according to an embodiment.

FIG. 6 is an example to illustrate splitting of a polygon. The polygon P to be split in FIG. 6 is a polygon with two holes. The polygon comprises of three loops: $L_1$ (ABCDE), $L_2$ (FGH), $L_3$ (JKMN). The orientation of loop $L_1$ is counterclockwise, and the orientations of loops $L_2$ and $L_3$ are clockwise. Two dividing lines $S_1$ (abG) and $S_2$ (FD) jointly divide the polygon into two polygons. For the dividing line $S_1$, since its starting point α is not a vertex in P, according to S21, add child nodes Aα (A, a, AB) and aB (a, B, AB) under the node of AB in the border forest.

According to S22, replace directional border AB in loop $L_1$ with Aa and aB. After the replacement, the directional borders in loop $L_1$ are: Aa, aB, BC, CD, DE, EA.

According to S23, since the starting and ending points of $S_1$ are not on the same loop, the loops $L_1$ and $L_2$ shall be merged into one loop. The steps for merging are as follows:

First rearrange the directional borders in $L_1$ as: aB, BC, CD, DE, EA, Aa, and add them to the new loop.

Add the directional borders in $S_1$ in their original order, namely adding ab, bG, into the new loop.

Rearrange the directional borders in $L_2$ as: GH, HF, FG, adding them to the new loop.

Add the directional borders in $S_1$ in reverse order, i.e. -bG, -ab, to the new loop. The sign "—" means the direction information in the directional border is false.

Therefore, directional borders of the merged loop (denoted as $L_4$) are: aB, BC, CD, DE, EA, Aa, ab, bG, GH, HF, FG, -bG, -ab. The merged polygon P has two loops: $L_4$ and $L_3$.

For the dividing line $S_2$, according to S24, the polygon P should be divided into two polygons X and Y. The steps are:

According to step S241, construct a loop $N_1$ as concatenation of: the directional borders in $S_2$ arranged in the original order, namely: -DF; the directional borders in $L_4$ arranged in the original circular order from D to F, namely: DE, EA, Aa, ab, bG, GH, HF. Thus loop $N_1$ is: -DF, DE, EA, Aa, ab, bG, Gil, HF.

Construct a loop $N_2$ as concatenation of: the directional borders lines in S2 arranged in reverse order, namely: DF; the directional borders in $L_4$ arranged in the original circular order from F to D, namely: FG, -bG, -ab, aB, BC, CD. Loop $N_2$ is thus: DF, FG, -bG, -ab, aB, BC, CD.

According to S242, construct a polygon X comprising loops $N_1$ and $L_3$. Polygon Construct polygon Y comprising loop Na. X, Y are the two polygons of the split result.

Figure 7:
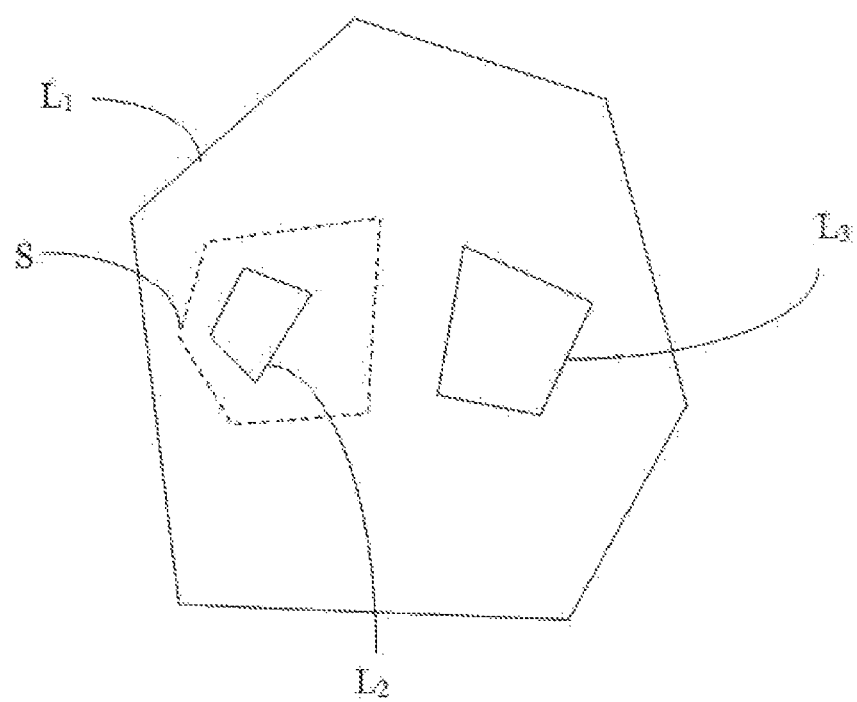
FIG. 7 illustrates examples of splitting a polygon according to an embodiment, wherein (a) illustrates geometry before splitting and (b) illustrates geometry after splitting.
Figure 7:
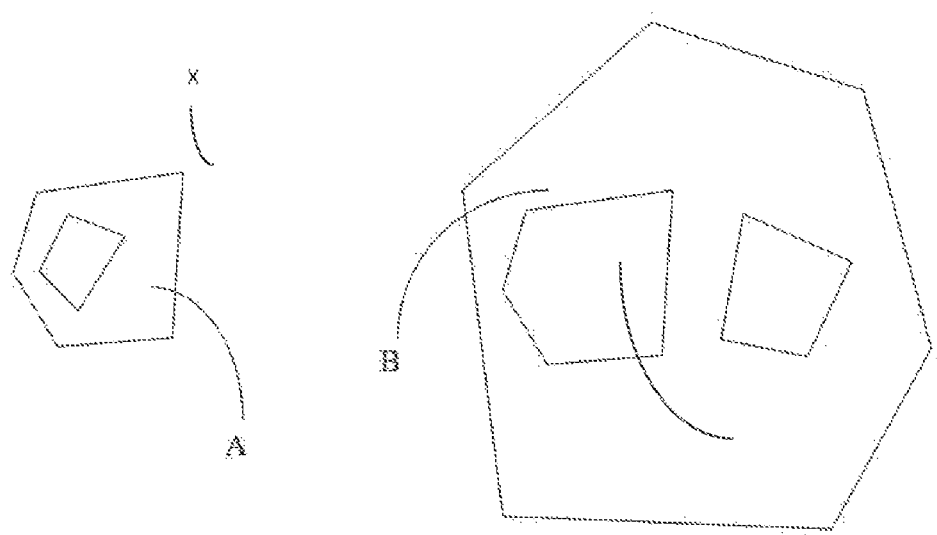

FIG. 7 is another example of splitting polygons. The polygon to be split in FIG. 7 is a polygon with two holes, which comprises of three loops: $L_1$, $L_2$, $L_3$. The orientation of the loop $L_1$ is counterclockwise, and the orientations of the loops $L_2$ and $L_3$ are clockwise. The dividing line S is a loop that divides the polygon into two polygons.

According to S25, arrange the directional borders in the loop S in counterclockwise orientation, and denoted it as X. Construct polygon A comprising of loop X and those loops inside X, thus A comprises of X, $L_2$. Construct polygon B comprising a loop comprising of the directional borders of S arranged in a clockwise orientation, denoted as Y, and other loops in the polygon, thus B comprises of Y, $L_1$, $L_3$, as shown in FIG. 7(b).

In an embodiment of the present invention, at least one initial geometric object exists in a blockchain system to provide input geometric object for the first geometric transaction. The initial geometric object is not generated by other geometric objects through transactions. The initial geometry can be specified by some artificially defined transactions having no input geometric object but having output geometric object; or is created by the blockchain system when creating a smart contract. The blockchain system does not verify geometrical integrity of this kind transaction. Generally, these kind transactions exist only in the genesis block of the blockchain, or when a smart contract is created. They can, however, also be generated in other ways, such as created as a reward for blockchain mining.

In an embodiment of the present invention, the initial geometry is a polygon representing the surface of the earth. This polygon is one with the International Date Line as its east and west boundaries. Geographic location is represented by its latitude and longitude coordinates in the area outside the area enclosed by the International Date Line and the 180-degree longitude line. In this area, a location west of the International Date Line is represented by coordinates (longitude coordinate −360°, latitude), and a location east of the International Date Line is represented by coordinates (longitude coordinate +360°, latitude). In the above polygon representing the entire surface of the earth, the west boundary coordinates corresponding to the 180-degree longitude are represented by coordinates (−180°, latitude), and the east boundary coordinates corresponding to the 180-degree longitude position is represented by (180°, latitude).

Further, each of the nodes and terminals in the blockchain system maintains a database of border forest. The database provides the finctions of querying parent border according to child border, and querying child borders according to parent border.

To improve efficiency, the database generates a bounding box for each node according to the following rules when adding leaf nodes:
1. The bounding box of a leaf node is a rectangle formed by the two endpoints of the node as opposite corners;
2. If the bounding box of a child node exceeds the bounding box of its parent node when adding the child node, expand the bounding box of the parent node to include the bounding box of the child node, and perform this step recursively upwards.

When S11 is executed, it needs to detect whether the two polygons have a common edge, the borders of the two polygons are compared in pairs. If their bounding boxes do not intersect, the pair of borders cannot include a common edge, thus further test for their sub-borders can be omitted. Only when their bounding boxes intersect, it is necessary to replace the borders with sub-borders for further detection. In this way, the computational complexity for the tests can be reduced from $O(N^2)$ to $O((\log N)^2)$, where N is the number of edges in the polygon.

When performing S21, it needs to test whether an endpoint is a vertex in the polygon and find the edge where it is located. We compare the endpoint and the bounding box of the borders in the polygon one by one. If the endpoint is not inside a bounding box, it can be determined without further testing that the endpoint is neither a vertex in the border nor on an edge in it. If the endpoint is inside the bounding box, further test the endpoint against the bounding boxes of the sub-borders until a leaf node whose bounding box contains the endpoint is found. In this way, the computational complexity of testing can be reduced from $O(N)$ to $O(\log N)$, where N is the number of edges in the polygon.

One embodiment of the present invention is a block chain system, the system comprises of several nodes and terminals, the nodes and terminals are connected to the Internet and communicate with each other through the Internet.

A terminal constructs transaction information according to the blockchain methods described above, and sends the transaction information to nodes in the blockchain system.

A node receives the transaction sent by a terminal or block sent by another node. The block is formed by packing transactions. The node verifies whether the received transaction or the transactions in the block is legal based on the blockchain methods described above. If the received block is legal, the block is appended to the tail of the local blockchain data. If the received transaction is legal, retain the transaction, periodically pack the received legal transactions into a block, append the packed block to the tail of the local blockchain data and broadcast the block to other nodes in the blockchain system.

One embodiment of the present invention is a method of storing polygons in a blockchain transaction, the method comprising the steps of:

Providing a storage medium, in the medium stored border forest and polygon data. Border forest comprises of a collection of border trees. Border tree is a tree data structure. A node of a border tree represents a contiguous segment of lines formed by the edges represented by all leaf nodes in the sub-tree rooted at that node.

If the set of a section of contiguous edges in a polygon comprises of the edges represented by all leaf nodes in a sub-tree rooted at a border tree node stored in the storage medium, save the index of the node in the polygon data to represent this section of contiguous edges.

If the starting point and the ending point of a segment of contiguous edges in a polygon are the two endpoints of an edge represented by a leaf node in the border forest, save the index of the leaf node in the polygon data to represent this segment of contiguous edges and add a sub-tree rooted at the leaf node to its border tree. The leaf nodes of the sub-tree comprise of nodes representing all the edges in the segment of contiguous edges.

For an edge in the polygon, if there is no leaf node representing the edge in the border forest, add a new border tree to the border forest. The new tree has only leaf node representing the edge. Store the index of the root node of the new border tree in the polygon data to represent the edge.

Store the polygon data above in the storage medium.

One embodiment of the present invention is an electronic device, including a storage device, a processor and a computer program stored in the storage device and executable on the processor. The electronic device implements any one of the blockchain methods above when the processor executes the program.

One embodiment of the present invention is a computer-readable storage medium in which a computer program is stored. When the computer program is executed by a processor, any one of the blockchain methods above is implemented.

As should be appreciated by technicians in the field, the embodiments described in the present application may be provided as a method, a system, or a computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media (including but not limited to disk storage, CD-ROM, optical storage, etc.) having computer-usable program code embodied therein.

The present invention is described in terms of steps of methods, apparatus (systems), and computer program products according to embodiments of the present application. It shall be construed that each step can be implemented by computer program instructions. These computer program instructions may be provided for a general purpose computer, special purpose computer, embedded processor or other programmable data processing device to produce a machine for implementing the functions specified in one or more steps by execution of a processor of a computer or other programmable data processing device.

These computer program instructions may also be loaded into a computer or other programmable data processing device, allowing a series of operational steps to be performed on the computer or the programmable device to produce a computer-implemented process for implementation of the functions specified in one or more steps described above.

Finally, it should be noted that the above embodiments are only used to illustrate the technical solutions of the present invention instead of limiting them. Although the detailed description of the present invention is described with reference to the above embodiments, technicians of the field should understand that the specific embodiments of the present invention can still be modified or equivalently replaced within the scope of the present invention and they shall fall within the scope of the claims of the present invention.

What is claimed is:

1. A blockchain method, comprising:
    S1. receiving information, wherein said information is a transaction or a block comprising packed transactions;
    S2. verifying whether the transaction contained in said information or the block comprising packed transactions is legitimate; and
    S3. providing a local blockchain; under a circumstance that said information is the block comprising packed transactions and said block is legitimate, appending said block after a tail of data of said local blockchain; under a circumstance that said information is the transaction and said transaction is legitimate, keeping said transaction; periodically packing received legitimate transactions into a packed block, appending said packed block after the tail of data of said local blockchain and broadcasting said packed block to other nodes in a blockchain network;
    wherein said transaction comprises tokens, and at least one of said tokens comprises data of a geometric object and said geometric object is a polygon.

2. The blockchain method of claim 1, wherein the transaction is legitimate under the circumstance that following three conditions are satisfied:
    condition 1: each input of said transaction is a reference to a spendable token;
    condition 2: said transaction is cryptographically authorized; and
    condition 3: said transaction is geometrically integral;
    wherein said spendable token is one of the following: an unspent output (UTXO) of another transaction in said local blockchain, and one of said tokens in an account of said local blockchain.

3. The blockchain method of claim 2, wherein said transaction is geometrically integral under the circumstance that both conditions 4 and 5 are satisfied:
    condition 4: there is no spatial overlap among output geometry objects; and
    condition 5: total space occupied by all input geometric objects is the same as total space occupied by all output geometric objects;
    wherein said input geometric objects are geometric objects in spendable tokens referenced by inputs of said transaction; and
    said output geometric objects are geometric objects in tokens of outputs of said transaction.

4. An electronic device comprising a storage device, a processor and a computer program stored in said storage device and executable by said processor, said electronic device is configured such that when said processor executes said program, implementing the method according to claim 3.

5. A non-transitory computer-readable storage medium in which a computer program is stored, when said computer program is executed by a processor, implementing a method according to claim 3.

6. The blockchain method of claim 2, wherein every geometric object in a transaction is a polygon, and said polygon comprises a group of loops, and each of said loops comprises an ordered list of directional borders, and each of said directional borders comprises a border and direction information; a border forest is a collection of border trees; each of said border trees is a tree data structure; said border is an index or a pointer referencing a node in said border forest; each node in each of said border trees represents a zigzag segment of lines formed by all edges represented by all leaf nodes in a sub-tree rooted at said node; comprising:
    merging all input polygons and all output polygons respectively to form a group of merged input polygons and a group of merged output polygons; and
    under the circumstance that said group of merged input polygons and said group of merged output polygons consist of same polygons, said transaction is geometrically integral;
    wherein said input polygons are polygons in spendable tokens referenced by inputs of said transaction; and
    said output polygons are polygons in tokens of outputs of said transaction;
    under the circumstance that quantities, orders, and contents of lists of directional borders of two loops are identical, or after at least one application of Op.1 or Op.2, the quantities, orders, and contents of the lists of directional borders of the two loops are identical, the two loops are equivalent:
    Op.1: circularly rotating a list of directional borders of one of the two loops; and
    Op.2: replacing a directional border in one of the two loops with sub-borders;
    two polygons are the same if loops in said two polygons correspond one-to-one by equivalence.

7. The blockchain method according to claim 6, comprising:
    S11. testing whether two polygons A and B to be merged have common edges; under the circumstance that a result of the test is affirmative, obtaining zigzag line segments composed of all common edges between said polygons A and B, providing endpoints of said zigzag line segments are $(e_1, f_1), (e_2, f_2), \ldots, (e_w, f_w)$ respectively, wherein said zigzag line segments share no common endpoints;
    S12. for each of said zigzag line segments $(e_j, f_j)$, performing following steps; a merged polygon consists of all non-empty loops remaining in said polygons A and B after all the steps are completed:
    S121. under the circumstance that said endpoint $e_j$ or $f_j$ is not an endpoint of a directional border that said endpoint is on, replacing said directional border with sub-borders in a loop containing said directional border repeatedly until each of said endpoint $e_j$ and $f_j$ is an endpoint of a directional border in said loop;

S122. under the circumstance that said zigzag line segment ($e_j$, $f_j$) appears in two different loops Q and R, merging said loops Q and R into a loop equivalent to a loop W, the method to generate said loop W comprising:

rearranging all directional borders of said loop Q and said loop R respectively in their original circular orders except for directional borders in said zigzag line segment ($e_j$, $f_j$) to form two new lists of directional borders, such that for each of said two new lists a starting point of first directional border and an ending point of a last direction border are endpoints of said zigzag line segment ($e_j$, $f_j$); concatenating said two new lists of directional borders to form a concatenated list, said new loop W consists of said concatenated list of directional borders; and S123. under the circumstance that said zigzag line segment ($e_j$, $f_j$) appears twice in a loop Z, splitting said loop Z into two new loops equivalent to loops $W_1$ and $W_2$, wherein said loop $W_1$ and said loop $W_2$ respectively comprise directional borders of said loop Z in their original cyclic order between said appearances of said zigzag line segment ($e_j$, $f_j$).

8. An electronic device comprising a storage device, a processor and a computer program stored in said storage device and executable by said processor, said electronic device is configured such that when said processor executes said program, implementing the method according to claim 6.

9. A non-transitory computer-readable storage medium in which a computer program is stored, when said computer program is executed by a processor, implementing a method according to claim 6.

10. An electronic device comprising a storage device, a processor and a computer program stored in said storage device and executable by said processor, said electronic device is configured such that when said processor executes said program, implementing the method according to claim 1.

11. A non-transitory computer-readable storage medium in which a computer program is stored, when said computer program is executed by a processor, implementing the method according to claim 1.

12. A blockchain method, comprising a step for constructing a transaction and a step for transmitting said transaction to a blockchain node, which further comprises one of the following steps: a step for splitting a polygon and a step for merging two polygons;

wherein each polygon in said transaction comprises a group of loops, and each of said loops comprises an ordered list of directional borders, and each of said directional borders comprises a border and direction information; a border forest is a collection of border trees; each of said border trees is a tree data structure; said border is an index or a pointer referencing a node in said border forest; each node in each of said border trees represents a segment of lines formed by all edges represented by all nodes in a sub-tree rooted at said node;

wherein said transaction comprises tokens, and at least one of said tokens comprises data of a geometric object and said geometric object is a polygon;

the step for splitting a polygon comprising:

providing a polygon P in input of said transaction to be split and a group of dividing lines S, wherein said polygon P comprises n loops $L_1, L_2, \ldots, L_n$; said group of dividing lines S comprises m dividing lines $S_1$, $S_2, \ldots, S_m$, each of said dividing lines comprises a list of directional borders, and for each said dividing line $S_i$, performing:

S21. testing whether two endpoints of said dividing line $S_i$ are both vertices in said polygon P, under the circumstance that an endpoint e of said dividing line $S_i$ is not a vertex in said polygon P, finding a node in said border forest representing an edge (a, b) of said polygon P that said endpoint e is on, adding to said border forest sub-nodes of said node to represent edges (a, e) and (e, b);

S22. under the circumstance that the two endpoints of said dividing line $S_i$ are different, testing whether each of said two endpoints is an endpoint of a directional border of a loop in said polygon P; under the circumstance that an endpoint r of said dividing line $S_i$ is not an endpoint of any directional border of any loop in said polygon P, replacing a directional border that said endpoint r is in with sub-borders in a loop containing said directional border repeatedly until said endpoint r is an endpoint of a directional border in said loop;

S23. under the circumstance that a starting point p and an ending point q of said dividing line $S_i$ are in two loops u and v of said polygon P respectively, merging said loop u, said loop v and said dividing line $S_i$ into a loop K in said polygon P; said loop K is equivalent to a loop comprising a list of directional borders by concatenating directional borders in the order of 1), 2), 3) and 4): 1) all directional borders in said loop u reordered according to their original circular order such that p is a starting point of a first directional border and an ending point of a last directional border; 2) all directional borders in said dividing line $S_i$ in its original order; 3) all directional borders in said loop v reordered according their original circular order such that q is a starting point of a first directional border and an ending point of a last directional border; 4) all directional borders in said dividing line $S_i$ in reversed order with their respective direction information reversed;

S24. under the circumstance that the starting point p and the ending point q of said dividing line $S_i$ are both on a loop L of said polygon P, splitting said polygon P into two polygons A and B, adding said polygons A and B to output of said transaction; the step for splitting said polygon P further comprising steps S241 and S242:

S241. constructing two loops $N_1$ and $N_2$, wherein said loop $N_1$ is a loop equivalent to a loop formed by concatenating following directional border lists: all directional borders in said dividing line $S_i$ in their original order; directional borders in said loop L that starts at q and ends at p in their original circular order; and said loop $N_2$ is a loop equivalent to a loop formed by concatenating following directional borders: all directional borders in $S_i$ in reversed order with their respective direction information reversed; directional borders in said loop L starting at p and ending at q in their original circular order;

S242. polygon A comprises said loop $N_1$ and all loops in said polygon P that is in interior of said loop $N_1$, polygon B consists of said loop $N_2$ and all loops in said polygon P that is in interior of said loop $N_2$; and S25. under the circumstance that the starting point and ending point of said dividing line $S_i$ are not on any loop of said polygon P, and said starting point and said ending point are the same vertex, splitting said polygon P into two polygons C and D, adding said polygons C and D to output of said transaction; wherein said polygon C is a polygon comprising a loop X which is equivalent to a list of all of directional borders in $S_i$ reordered in counterclockwise orientation and all loops in said polygon P which are in interior of said loop X; said polygon D is a polygon comprising a loop which is equivalent to a list of all of directional borders in $S_i$ rearranged in clockwise orientation and all other loops in said polygon P;

the step for merging polygons comprising:

S11. testing whether two polygons E and F in input of said transaction to be merged have common edges; under the circumstance that a result of said test is affirmative, obtaining zigzag line segments composed of all common edges between said polygons E and F, providing endpoints of said zigzag line segments are $(e_1, f_1), (e_2, f_2), \ldots, (e_w, f_w)$ respectively, wherein said zigzag line segments share no common endpoints;

S12. for each of said zigzag line segments $(e_j, f_j)$, performing following steps; said merged polygon comprises all non-empty loops remaining in said polygons E and F after all the steps are completed:

S121. under the circumstance that said endpoint $e_j$ or $f_j$ is not an endpoint of a directional border that said endpoint is on, replacing said directional border with sub-borders in a loop containing said directional border repeatedly until each of $e_j$ and $f_j$ is an endpoint of directional borders in said loop;

S122. under the circumstance that said line segment $(e_j, f_j)$ appears in two different loops Q and R, merging said loops Q and R into a loop equivalent to a loop W and adding said loop into output of said transaction, wherein said loop W is generated with a step comprising:

rearranging all directional borders of said loops Q and R in their original circular order respectively except for directional borders in said line segment (ej, fj) to form two new lists of directional borders, such that for each of said two new lists a starting point of a first directional border and an ending point of a last direction border are endpoints of said line segment $(e_j, f_j)$;

concatenating said two new lists of directional borders to form a concatenated list, said loop W comprises said concatenated list of directional borders; and S123. under the circumstance that said line segment $(e_j, f_j)$ appears twice in a loop W, splitting said loop W into two new loops equivalent to loops $W_1$ and $W_2$, wherein said loop $W_1$ and said loop $W_2$ respectively comprise directional borders of said loop W in their original cyclic order between said appearances of said line segment $(e_j, f_j)$; adding said loop $W_1$ and said loop $W_2$ into output of said transaction;

under the circumstance that quantities, orders, and contents of lists of directional borders of two loops are identical, or after at least one application of Op.1 or Op.2, the quantities, orders, and contents of the lists of directional borders of said two loops are identical, said two loops are equivalent:

Op.1: circularly rotating a list of directional borders of one of the two loops; and Op.2: replacing a directional border in one of the two loops with sub-borders.

13. A blockchain system comprising a plural number of nodes and a plural number of terminals, wherein said nodes are computers, servers or blockchain mining electronic equipments, said terminals are electronic devices; said nodes and said terminals are connected to an Internet and communicating with each other through the Internet;

at least one of said terminals is configured to construct a transaction according to the blockchain method of claim 12 per user, and to transmit said transaction to one or more of said nodes;

a node which is one of said nodes is configured to receive said transaction; a local blockchain is provided in said node; said node is further configured to verify whether said transaction is legitimate according to the blockchain method of claim 3 and under the circumstance that said transaction is legitimate, keeping said transaction, periodically packing received legitimate transactions into a packed block, appending said packed block to the tail of said local blockchain data and broadcasting said packed block to at least one other node of said nodes in said blockchain system.

14. A blockchain system comprising a plural number of nodes and a plural number of terminals, wherein said nodes are computers, servers or blockchain mining electronic equipments, said terminals are electronic devices; said nodes and said terminals are connected to an Internet and communicating with each other through the Internet;

at least one of said terminals is configured to construct a transaction according to the blockchain method of claim 12 per user, and to transmit said transaction to one or more of said nodes;

a node which is one of said nodes is configured to receive said transaction; a local blockchain is provided in said node; said node is further configured to verify whether said transaction is legitimate according to the blockchain method of claim 4 and under the circumstance that said transaction is legitimate, keeping said transaction, periodically packing received legitimate transactions into a packed block, appending said packed block to the tail of said local blockchain data and broadcasting said packed block to at least one other node of said nodes in said blockchain system.

15. An electronic device comprising a storage device, a processor and a computer program stored in said storage device and executable by said processor, said electronic device is configured such that when said processor executes said program, implementing the method according to claim 12.

16. A non-transitory computer-readable storage medium in which a computer program is stored, when said computer program is executed by a processor, implementing a method according to claim 12.

17. A blockchain method for storing polygon data in a blockchain node, providing a transaction and a border forest, wherein said transaction comprises tokens, and at least one of said tokens comprises data of a geometric object and said geometric object is a polygon;

wherein said border forest comprises a collection of border trees; each of said border trees is a tree data structure and each node in each of said border trees represents a contiguous segment of lines formed by all edges represented by all leaf nodes in a sub-tree rooted at said node;

comprising:

under the circumstance that a set of a segment of contiguous edges in said polygon is identical to a set of edges represented by all leaf nodes in a sub-tree rooted at a node in said border forest, saving a reference of said node in said polygon data to represent said segment of contiguous edges;

under the circumstance that a starting point and an ending point of a segment of contiguous edges in said polygon are two endpoints of an edge represented by a leaf node of a border tree, saving a reference of said leaf node in said polygon data to represent said segment of contiguous edges, adding a sub-tree to said border tree with said leaf node as a root, such that all edges in said segment of contiguous edges are represented by all leaf nodes of the sub-tree;

for an edge in said polygon, under the circumstance that there is no leaf node in said border forest that represents said edge, adding a new border tree to said border forest, such that a set of edges represented by all leaf nodes in said new border tree contains only said edge; saving a reference of a root node of said new border tree in said polygon data to represent said edge; and storing said polygon data in a storage medium of said blockchain node.

\* \* \* \* \*